United States Patent
Dickey

[15] 3,673,771
[45] July 4, 1972

[54] MULTI-CHANNEL PARTICLE SEPARATOR

[72] Inventor: Thomas A. Dickey, Westport, Conn.
[73] Assignee: Avco Corporation, Stratford, Conn.
[22] Filed: Nov. 23, 1970
[21] Appl. No.: 91,820

[52] U.S. Cl. .................................. 55/306, 55/394, 55/440, 55/444
[51] Int. Cl. ........................................................ B01d 46/48
[58] Field of Search ............. 55/306, 394, 397, 440, 442–444

[56] References Cited

UNITED STATES PATENTS

| 2,802,618 | 8/1957 | Prachar ................................... 55/306 |
| 2,931,460 | 4/1960 | McEachern ............................. 55/306 |
| 2,946,401 | 7/1960 | Serner .................................... 55/444 |
| 3,616,616 | 11/1971 | Flatt ....................................... 55/306 |

FOREIGN PATENTS OR APPLICATIONS

| 29,362 | 7/1925 | France .................................... 55/440 |
| 322,684 | 12/1929 | Great Britain ........................... 55/394 |

*Primary Examiner*—Tim R. Miles
*Attorney*—Charles M. Hogan and Eugene C. Goodale

[57] ABSTRACT

A multi-channel particle separator for separating and removing foreign particles from engine inlet air is disclosed. The multi-channel particle separator utilizes a plurality of concentric catching rings mounted in the air inlet passageway. The leading edge of each ring is mounted to the air swirl vanes. Each trailing or catching portion of the rings is connected with struts which serve as particle scavenge vanes and air deswirl vanes.

7 Claims, 3 Drawing Figures

PATENTED JUL 4 1972 3,673,771
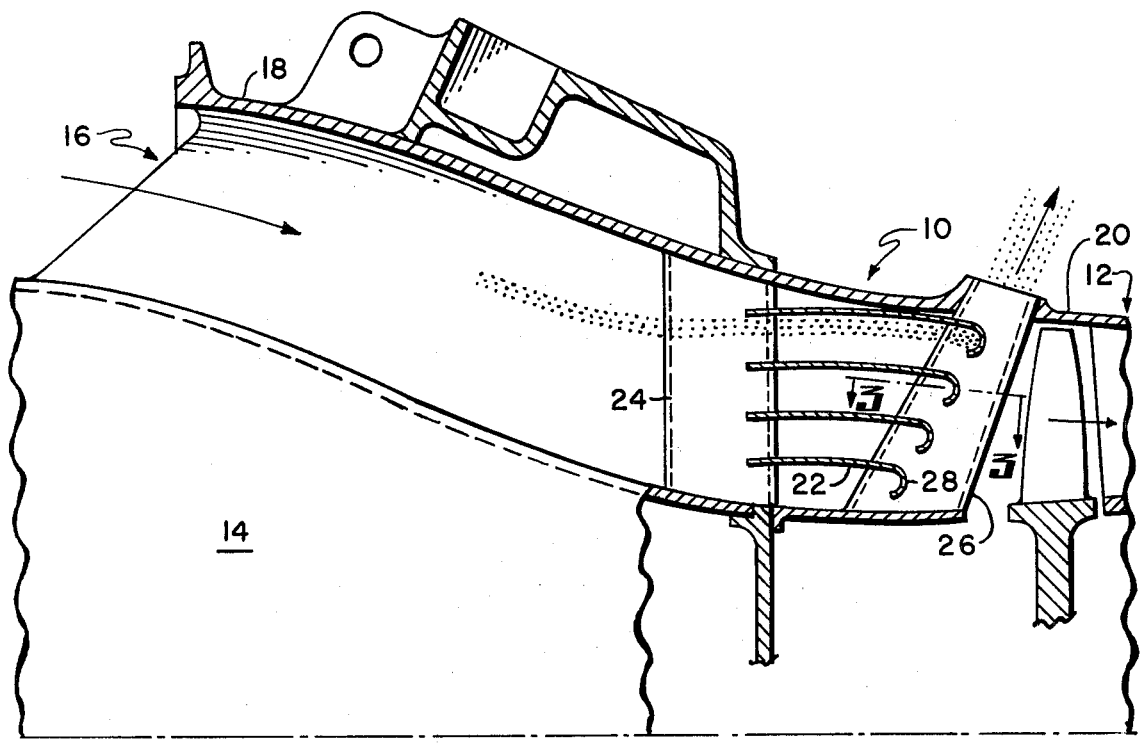
Fig 1
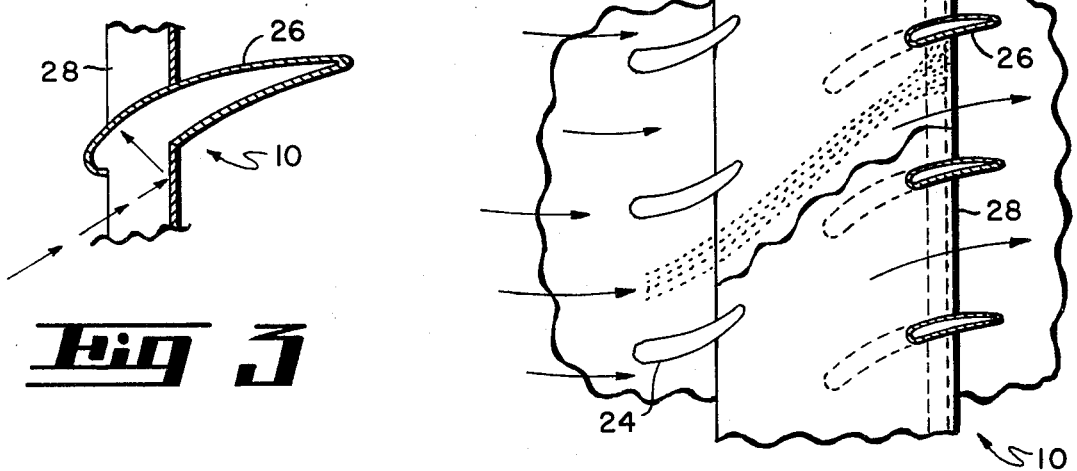
Fig 3
Fig 2
INVENTOR.
THOMAS A. DICKEY
BY Charles M. Hogan
Eugene C. [illegible]
ATTORNEYS.

3,673,771

MULTI-CHANNEL PARTICLE SEPARATOR

BACKGROUND OF THE INVENTION

This invention relates to air intakes, particularly intakes for gas turbine engines which are required to operate in sand or dust laden air, and more particularly to a multichannel particle separator incorporated in the air intake passageway.

The use of turbine-powered helicopters in severe sand laden atmospheric conditions has resulted in a dramatic increase in cases of engine erosion damage and has underscored the need for effective systems to protect gas turbine engines from sand and dust ingestion. Solutions to these problems have yielded a wide variety of particle separator concepts which are generally appended to the engine installation. Examples of such separators are shown in U.S. Pats. Nos. 3,371,471 and 3,534,548, both issued to H. D. Connors and assigned to Avco Corporation.

The increased engine protection afforded by these units has more than justified their use. However, physical limitations imposed by this add-on approach sometimes result in the aircraft system suffering from lower sand collection efficiencies, higher weight, and larger losses in power than may be necessary. These problems can be significantly reduced by providing a particle separator which is incorporated within the engine air inlet.

Accordingly, it is an object of this invention to provide a particle separator which is integral with the engine air inlet passageway.

A further object of this invention is to provide a particle separator having high scavenge efficiency due to centrifugal effects.

A still further object of this invention is to provide a particle separator having multi-channel separating facilities and which further operates as an FOD screen.

Another object of this invention is to provide a particle separator requiring less axial distance between swirl and deswirl members.

SUMMARY OF THE INVENTION

This invention provides an improved multi-channel particle separator for removing foreign particles from the stream of air supplied to the compressor of an engine. The separator consists of static components which are mounted in the annular air intake passageway. A plurality of concentric catching rings is mounted in the passageway. Swirl vanes support the concentric rings at the leading edge thereof. The particle catching portion of each concentric ring is displaced axially one to the other to minimize pressure loss due to the drag of the catching portion. The catching portion of each ring is supported by and in communication with hollow struts. The struts receive and pass particles radially outward for exhaustion and also provide a deswirl function for clean air passing through the separator.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a side view, partially cut away, through part of the air intake of a gas turbine engine which is provided with the multi-channel particle separator according to the present invention;

FIG. 2 is a fragmentary view radially inward of two concentric rings viewed in a linear manner; and FIG. 3 is a cross-sectional view of one deswirl strut taken along line 3—3 of FIG. 1.

DESCRIPTION OF THE ILLUSTRATIVE EMBODIMENT

Reference is now made to FIG. 1 which illustrates one exemplary embodiment of the improved particle separator of this invention which is designated generally by the reference numeral 10. The separator 10 is mounted at the forward end of the turbine engine just ahead of the compressor stage 12. The annular gear housing 14 forms the inner wall of the engine air inlet passageway 16. The outer wall of the passageway 16 is defined by the annular inlet housing 18.

The particle separator 10 is mounted downstream of the entrance of the air inlet passageway 16 and before the first compressor stage 12 defined by the axial compressor casing 20. The separator 10 comprises a plurality of annular concentric cylinders or rings 22 mounted in the air passageway 16. The rings 22 provide walls to define a plurality of smaller annular passageways through the separator 10. The leading edge of each concentric ring is supported and secured, by any suitable means, by a row of circumferentially spaced radially extending swirl vanes 24 mounted in the annular passageway 16. Another row of circumferentially spaced deswirl vanes 26 are mounted in the passageway 16 adjacent the outlet of the passageway 16. The vanes 26 extend radially outward in an angularly downstream direction.

Each annular ring 22 is formed with a particle catching portion or lip 28 at the trailing edge thereof. The trailing edge portion of each annular ring 22 is supported by the deswirl vanes 26. The deswirl vanes 26 are hollow and the walls are slotted where each ring is supported such that the interior of the vanes 26 are in communication with the catching lip portion 28 of each annular ring 22. Thus, particles collected in the lip 28 will be transmitted to the interior of the deswirl vanes 26.

The particle separator of this invention is based on the trajectory of a particle as a result of induced tangential momentum imparted by the swirl vanes 24. The particles are transported in the airstream by means of aerodynamic forces and, if a tangential momentum is induced in the particles by means of a stationary cascade of swirl vanes 24, the particles travel in a spiral trajectory toward the outer wall of an annulus and tend to concentrate along the inside surface of each annular ring 22. Thus, by scavenging a small amount of air along this surface by the use of the catching lips 28, the particles will be removed from the airstream passing therethrough. In the drawings, clean air is represented by long arrows and the dust or foreign particles are diagrammatically represented by dots and dashes.

It has been found that spacing of the concentric rings approximately one-fourth inch apart provides for excellent particle separation. With the rings so spaced, it can be seen that the separator also prevents large objects from being ingested into the compressor. In order to enhance the inertia separation the walls of the annular rings are slightly contoured to provide additional flow curvature.

The particle catching lips 28 are displaced axially downstream one to the other to minimize blockage effects and pressure loss due to drag on the catching lip.

Referring in particular to FIGS. 2 and 3, an illustrated flow diagram of particles is shown. The view in FIG. 2 is looking radially inward at two concentric rings in stepped fashion to illustrate the particle flow path between the annular rings. For illustrative purposes, the rings have been unfolded in a linear fashion. The particles pass through the cascade of swirl vanes 24 which impart the desired tangential momentum to the particles. The particles progress along the inner wall surface of the annular ring and are trapped by the catching lip portion 28. The particles progress around the catching lip portion 28 and exit from each such portion wherever the portion 28 is supported by deswirl vane 26 and in communication with the interior thereof as shown in FIG. 3. The particles are collected in the vanes 26 and are exhausted therefrom by any suitable means such as a blower (not shown). The angular displacement of the vanes 26 also facilitates for the particles to progress radially outward through the hollow vanes 26. The vanes 26 have a configuration sufficient to provide a deswirl function to the clean air passing through the separator 10 so that air swirl is removed before the air reaches the compressor stage 12.

Because of the unique structural features of the particle separator of this invention, it is seen that there is no need for extraneous add-on structures to be placed on the engine. The particle separator is mounted in the air inlet passageway upstream of the first compressor stage. Accordingly, it can be seen that this invention accomplishes the objectives hereinabove set forth.

While a present exemplary embodiment of this invention has been illustrated and described, it will be recognized that this invention may be otherwise variously embodied and practiced by those skilled in the art.

What is claimed is:

1. In a gas turbine engine, the combination comprising:
   an air intake passageway;
   a plurality of concentric separating elements mounted in said passageway, said elements having a particle entrapping portion at the trailing edge thereof;
   a row of circumferentially spaced radially extending swirl vanes mounted in said passageway for imparting a centrifugal action to particles passing therethrough, said row of vanes supporting the leading edge of said plurality of concentric separating elements;
   a row of circumferentially spaced hollow struts supporting the particle entrapping portion of each of said separating elements, said struts having openings therealong wherein said hollow interior of each strut is in communication with the particle entrapping portion for receiving particles entrapped thereby.

2. The combination according to claim 1 in which said concentric separating elements comprise cylinders and in which the catching portion of each separating cylinder is a catching lip.

3. The combination according to claim 2 in which said catching lips are displaced axially downstream one to the other and in which said hollow struts are deswirl vanes, each vane being radially extending in an axial direction.

4. The combination according to claim 3 in which the axial wall of each of said cylinders is contoured to enhance the inertia separation, said cylinders defining a plurality of annular passageways within the air intake passageway.

5. A particle separator in an inlet of a gas turbine engine comprising:
   a plurality of annular concentric rings mounted in the annular inlet passageway, each of said rings terminating in a catching lip, said rings defining a plurality of annular passageways within the inlet passageway;
   a row of circumferentially spaced radially extending swirl vanes mounted in the annular inlet passageway and supporting the leading edge of each of said concentric rings;
   a row of hollow deswirl vanes circumferentially spaced in the annular inlet passageway and supporting the catching lip portion of each of said annular rings, said deswirl vanes being formed with apertures complementary with each of said catching lips wherein said lip areas are in communication with the interior of said deswirl vanes whereby particles entrapped by said catching lip are transmitted into said deswirl vanes.

6. A particle separator according to claim 5 in which each of said annular rings is axially contoured to enhance the inertia separation and the catching lips are axially displaced one from the other to minimize pressure loss due to the drag of the catching lips.

7. The separator according to claim 6 in which each of said deswirl vanes is radially extending in an axial direction.

* * * * *